United States Patent
Nakamura et al.

(10) Patent No.: US 10,635,240 B2
(45) Date of Patent: Apr. 28, 2020

(54) OPTICAL TOUCH PANEL AND AUTOMATIC VENDING MACHINE

(71) Applicant: FUJI ELECTRIC CO., LTD., Kawasaki-shi, Kanagawa (JP)

(72) Inventors: Makoto Nakamura, Yokkaichi (JP); Shimoto Ichihara, Yokkaichi (JP); Tomonori Maekawa, Yokkaichi (JP); Yuki Wagatsuma, Tsu (JP); Shinya Nakanishi, Mie-gun (JP); Yoshito Shibata, Tsu (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 133 days.

(21) Appl. No.: 15/856,879

(22) Filed: Dec. 28, 2017

(65) Prior Publication Data

US 2018/0120969 A1     May 3, 2018

Related U.S. Application Data

(63) Continuation of application No. PCT/JP2016/066787, filed on Jun. 6, 2016.

(30) Foreign Application Priority Data

Jul. 17, 2015   (JP)  ................................ 2015-143455

(51) Int. Cl.
*G06F 3/042*     (2006.01)
*G06F 3/041*     (2006.01)
*G07F 9/02*     (2006.01)

(52) U.S. Cl.
CPC ............ *G06F 3/042* (2013.01); *G06F 3/0416* (2013.01); *G06F 3/0421* (2013.01); *G07F 9/023* (2013.01)

(58) Field of Classification Search
USPC .................... 345/156, 173, 174, 175; 356/51
See application file for complete search history.

(56) References Cited

U.S. PATENT DOCUMENTS

| 6,100,538 A | 8/2000 | Ogawa |
| 8,838,410 B2 | 9/2014 | Yoshimura |

(Continued)

FOREIGN PATENT DOCUMENTS

| JP | 11-3170 | 1/1999 |
| JP | 11-232537 | 8/1999 |

(Continued)

OTHER PUBLICATIONS

Japanese Office Action dated Oct. 9, 2018 in corresponding Japanese Patent Application No. 2017-529498.

(Continued)

*Primary Examiner* — Thuy N Pardo (57) ABSTRACT

An optical touch panel includes: a pair of retroreflective plates that are arranged inside at least a left and right pair of frame portions facing each other in a rectangular frame; a plurality of detectors that are arranged at four corners of the rectangular frame, the detectors being configured to irradiate infrared rays to, at least, the retroreflective plates, and to generate detection images based on reflection light from the retroreflective plates; and an operation determining unit configured to detect a touch position based on the detection images generated by the detectors.

12 Claims, 10 Drawing Sheets

(56) References Cited

U.S. PATENT DOCUMENTS

| | | | |
|---|---|---|---|
| 2011/0050650 A1* | 3/2011 | McGibney | G06F 3/0386 345/175 |
| 2011/0157044 A1 | 6/2011 | Yu | |
| 2011/0199339 A1* | 8/2011 | Briden | G06F 3/0421 345/175 |
| 2012/0002217 A1 | 1/2012 | Kobayashi et al. | |
| 2012/0092647 A1* | 4/2012 | Lim | G01J 1/0271 356/51 |
| 2012/0299879 A1 | 11/2012 | Kim | |
| 2013/0120252 A1* | 5/2013 | Lam | G06F 3/033 345/157 |
| 2013/0201100 A1* | 8/2013 | McGibney | G06F 3/005 345/156 |
| 2014/0118305 A1* | 5/2014 | Jang | G06F 3/0418 345/175 |
| 2015/0029165 A1* | 1/2015 | Thompson | G06F 3/0416 345/179 |
| 2015/0277586 A1* | 10/2015 | Trenholm-Boyle | G06F 3/0383 345/157 |
| 2018/0018014 A1* | 1/2018 | Lutnick | G07F 17/3209 345/173 |

FOREIGN PATENT DOCUMENTS

| | | |
|---|---|---|
| JP | 2002-351615 A | 12/2002 |
| JP | 2004-54065 | 2/2004 |
| JP | 2005-339342 A | 12/2005 |
| JP | 2009-289084 | 12/2009 |
| JP | 2011-138509 | 7/2011 |
| JP | 2012-14427 | 1/2012 |
| JP | 2012-59228 A | 3/2012 |
| JP | 2013-513852 | 4/2013 |
| JP | 2013-88936 A | 5/2013 |
| JP | 2014-52696 | 3/2014 |

OTHER PUBLICATIONS

Japanese Office Action dated Jan. 8, 2019 in corresponding Japanese patent Application No. 2017-529498.
International Search Report dated Aug. 9, 2016 in corresponding International Patent Application No. PCT/JP2016/066787.
Written Opinion of the International Searching Authority dated Aug. 9, 2016 in corresponding International Patent Application No. PCT/JP2016/066787.

* cited by examiner

FIG.11

OPTICAL TOUCH PANEL AND AUTOMATIC VENDING MACHINE

CROSS-REFERENCE TO RELATED APPLICATION(S)

This application is a continuation of International Application No. PCT/JP2016/066787, filed on Jun. 6, 2016 which claims the benefit of priority of the prior Japanese Patent Application No. 2015-143455, filed on Jul. 17, 2015, the entire contents of which are incorporated herein by reference.

BACKGROUND

1. Technical Field

The disclosure relates to an optical touch panel and an automatic vending machine.

2. Related Art

In recent vending machines, product samples are displayed as an image using a display incorporated in a front door, and selection of a product is made by using a touch panel or the like (Japanese Laid-open Patent Publication No. 11-232537). Use of this display and the touch panel can make automatic vending machines expandable.

On the other hand, in Japanese Laid-open Patent Publication No. 2009-289084, as one example of the touch panel, that of a capacitive type, an optical type, and an ultrasonic type are described. Moreover, in Japanese Laid-open Patent Publication No. 2014-52696, one that detects a position of a pointer that is in contact with or close to a detection surface by using detection criteria that is set for each predetermined position within the detection surface in advance is described.

In Japanese Laid-open Patent Publication No. 2004-54065, one that relates to position detection by a light blocking scheme, and in which an optical sensor that emits and receives light is arranged on one side of a detection region, and a thin optical retroreflective frame is provided on another side is described. Japanese Laid-open Patent Publication No. 2004-54065 discloses that a light source flashes to obtain a difference between signals at a light-on and at a light-off, to reduce an influence of ambient light.

In Japanese Laid-open Patent Publication No. 11-3170, one that includes a detector that is arranged, to acquire positional coordinates of a pointer that emits radiation light on a coordinate plane directly or indirectly, near the coordinate plane, and that receives the radiation light to convert into an electrical signal, an optical unit that makes a range of receivable radiation light parallel to the coordinate plane by limiting a field of view of the detector to a predetermined height or less from the coordinate plane, and a shielding unit, such as a shielding frame, that is arranged so as to surround a periphery of the coordinate plane, and that remove unnecessary light other than the radiation light from the field of view is described.

SUMMARY

There has been an optical touch panel in which a retroreflective plate is arranged inside a rectangular frame, and an upper-left detector and an upper-right detector that diagonally irradiate infrared rays toward a right lower side and left lower side, respectively, and detect returning light from the retroreflective plate are arranged at an upper left corner and an upper right corner of the frame. The optical touch panel detects a touch of an operation member based on a position of a shade of the returning light from the retroreflective plate detected by the upper-left detector and the upper-right detector.

When such an optical touch panel is arranged perpendicularly on a front panel of an automatic vending machine or the like, the optical touch panel is generally arranged outside. Accordingly, dust, snow, or the like are apt to accumulate on the retroreflective plate on an upper surface of a lower portion of the optical touch panel. When dust or snow accumulates on the retroreflective plate, an amount of reflection from the retroreflective plate decreases, resulting in deterioration of detection accuracy.

It is an object of the disclosure to at least partially solve the problems in the conventional technology.

In some embodiments, an optical touch panel includes: a pair of retroreflective plates that are arranged inside at least a left and right pair of frame portions facing each other in a rectangular frame; a plurality of detectors that are arranged at four corners of the rectangular frame, the detectors being configured to irradiate infrared rays to, at least, the retroreflective plates, and to generate detection images based on reflection light from the retroreflective plates; and an operation determining unit configured to detect a touch position based on the detection images generated by the detectors.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Embodiments of the disclosure are explained below with reference to the accompanying drawings.

First Embodiment

Figure 1:
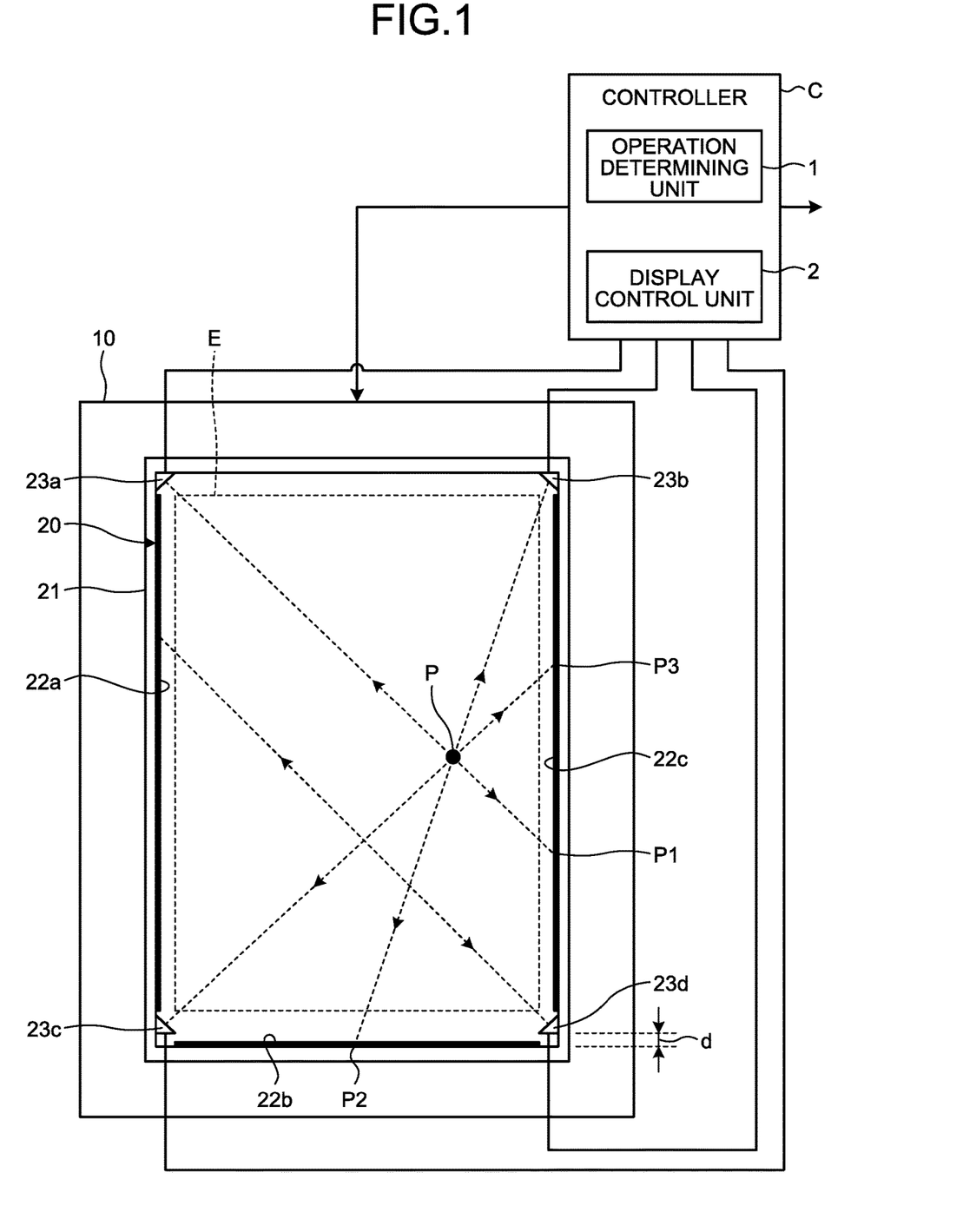
FIG. 1 is a schematic diagram showing a configuration outline of an optical touch panel of a first embodiment of the disclosure.

FIG. 1 is a schematic diagram showing a configuration outline of an optical touch panel of a first embodiment of the disclosure. As shown in FIG. 1, a touch detector 20 is arranged on a surface of a display panel 10 that has a display region corresponding to a detection region E.

The touch detector 20 has the detection region E in a rectangular shape inside a rectangular frame 21. The touch detector 20 has retroreflective plates 22a, 22b, 22c that generate reflection light to an axis of input light on a left-frame internal side surface, a lower-frame internal side-surface, and a right-frame internal side-surface of the frame 21, respectively. Moreover, the touch detector 20 has an upper-left detector 23a, an upper-right detector 23b, a lower-left detector 23c, and a lower right detector 23d at an upper left corner, an upper right corner, a lower left corner, and a lower right corner, respectively. The lower-left detector 23c and the lower-right detector 23d are arranged at a distance d upward from the lower frame. This distance d is a value corresponding to the depth of dust, snow, or the like accumulated on the retroreflective plate 22b.

The upper-left detector 23a irradiates an infrared ray to the retroreflective plates 22b, 22c, and receives reflection light from the retroreflective plates 22b, 22c. The upper-right detector 23b irradiates an infrared ray to the retroreflective plates 22a, 22b, and receives reflection light from the retroreflective plates 22a, 22b. The lower-left detector 23c irradiates an infrared ray to the retroreflective plate 22c, and receives reflection light from the retroreflective plate 22c. The lower-right detector 23d irradiates an infrared ray to the retroreflective plate 22a, and receives reflection light from the retroreflective plate 22a. Each of infrared-ray irradiating units of the upper-left detector 23a, the upper-right detector 23b, the lower-left detector 23c, and the lower-right detector 23d is implemented by, for example, an infrared-ray light-emitting diode (LED). Moreover, each of infrared-ray detectors of the upper-left detector 23a, the upper-right detector 23b, the lower-left detector 23c, and the lower-right detector 23d is implemented by, for example, an infrared-ray image sensor.

Figure 2:
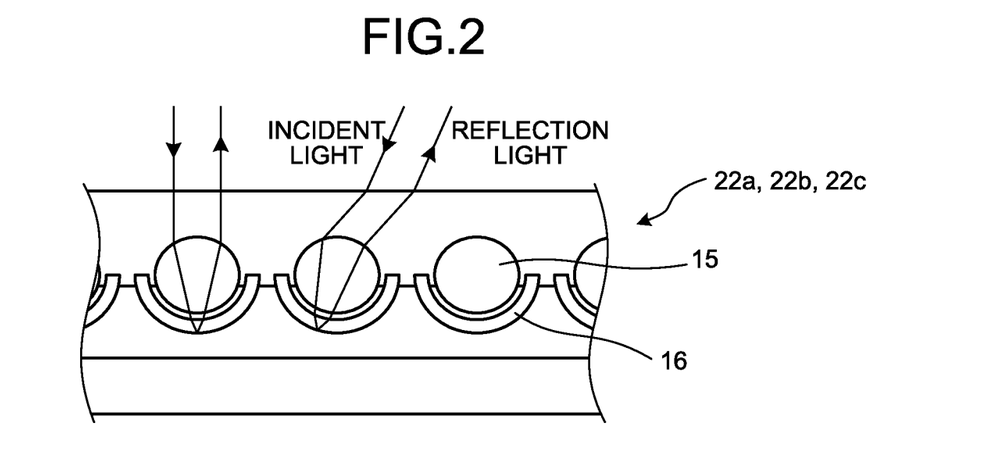
FIG. 2 is a cross-section showing a configuration of a retroreflective plate.

The retroreflective plates 22a, 22b, 22c are stripe-shaped tapes, and reflect infrared incident light as reflection light in the same direction as the incident light as shown in FIG. 2. Specifically, the retroreflective plates 22a, 22b, 22c have a number of minute glass beads 15, which are glass balls, encrusted over surfaces of the retroreflective plates 22a, 22b, 22c, and have reflection films 16 formed on undersides of the glass beads 15. The retroreflective plates 22a, 22b, 22c can also be implemented by a corner cube prism group in which multiple corner cube prisms are densely arranged in a plane. In this planner arrangement, it is preferable that incoming and outgoing faces of the respective corner cube prisms be arranged densely. The corner cube prisms are triangular pyramid prisms consisted of three right angles of 90 degrees, and has a characteristic that a reflected light beam always returns in the direction of an optical axis of incident light.

A controller C is connected to the upper-left detector 23a, the upper-right detector 23b, the lower-left detector 23c, the lower-right detector 23d, and a display panel 10, and to an external device not shown. The controller C has an operation determining unit 1 (e.g. operation determining circuitry) and a display control unit 2. The operation determining unit 1 determines whether a touch by an operation member has been made based on a detection image of the operation member obtained by the touch detector 20. The operation determining unit 1 identifies coordinates of a position at which the touch has been made in the detection region E. The display control unit 2 performs display processing according to the touch position of the operation member determined by the operation determining unit 1 for the display panel 10.

Detection Operation by Touch Detector

Figure 3:
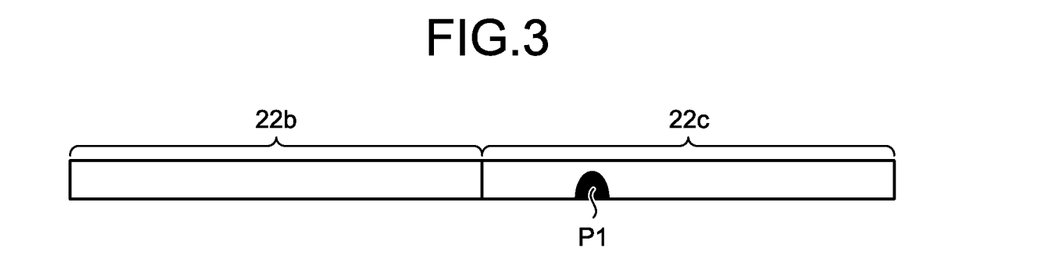
FIG. 3 shows one example of an image that is detected by an upper-left detector.

First, the upper-left detector 23a and the upper-right detector 23b are capable of detection in an entire area in the detection region E. Moreover, the lower-left detector 23c is capable of detection in an area of the detection region E on the right side relative to a diagonal line to the upper-right detector 23b. Furthermore, the lower-right detector 23d is capable of detection in an area of the detection region E on the left side relative to a diagonal line to the upper-left detector 23a. For example, as shown in FIG. 1, when an operation member has touched at a position on the right side in the detection region E, the upper-left detector 23a can acquire a detection image shown in FIG. 3. In this detection image, a shadow P1 from which no infrared ray returns due to the presence of the operation member is included. Similarly, the upper-right detector 23b can acquire a detection image in which a shadow P2 is included. Moreover, the lower-left detector 23c can acquire a detection image in which a shadow P3 is included. The lower-right detector 23d cannot acquire a detection image including a shadow because a position P is outside the detection region. The operation determining unit 1 identifies the position P in the detection region E based on the three detection images including the shadows P1, P2, P3. Identification of this position P can be performed by triangulation such as forward intersection, using two or more detection images including a shadow.

Figure 4:
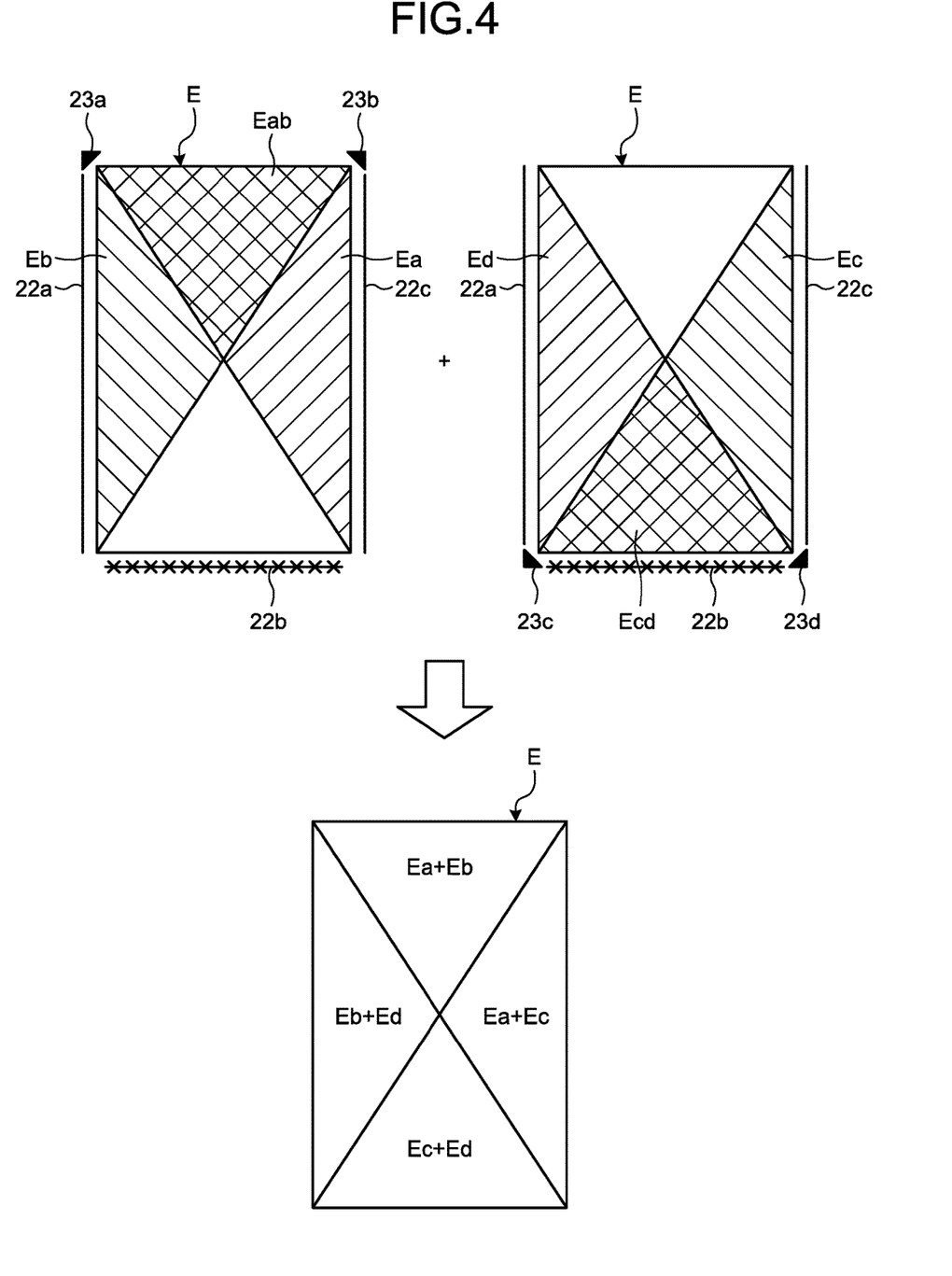
FIG. 4 is an explanatory diagram for explaining detection processing when an amount of reflection of the retroreflective plate arranged at a lower frame is small.

Detection Operation when Reflection Amount of Retroreflective plate 22b is Small The detection region E is a layered space in which a front side is open as shown in FIG. 4 and, accordingly, causes a state that the retroreflective plate 22b is apt to receive dust, snow, or the like accumulated thereon. When dust, snow, or the like accumulates on the retroreflective plate 22b, a reflection amount of reflection light from the retroreflective plate 22b decreases. Therefore, determination of a shadow in a detection image becomes difficult, resulting in deterioration of the detection accuracy. That is, as shown in FIG. 4, a detection region of the upper-left detector 23a is to be only a detection region Ea corresponding to the retroreflective plate 22c. Similarly, a detection region of the upper-right detector 23b is to be only a detection region Eb corresponding to the retroreflective plate 22a. Therefore, in a conventional optical touch panel having only two detectors of the upper-left detector 23a and the upper-right detector 23b, a detection region has been only a detection region Eab that is an overlapped region of the detection regions Ea, Eb when the reflection amount of the retroreflective plate 22b has decreased.

In this first embodiment, the lower-left detector 23c and the lower-right detector 23d that do not use the retroreflective plate 22b are provided. Thus, as shown in an upper right part of FIG. 4, detection regions Ec, Ed that are horizontally symmetric to the detection regions Ea, Eb of the two detectors, the upper-left detector 23a and the upper-right detector 23b, are formed. As a result, as shown in a lower part of FIG. 4, even when the retroreflective plate 22b cannot be used, two detection images for the entire area of the detection region E can be obtained by the four detectors, the upper-left detector 23a, the upper-right detector 23b, lower-left detector 23c, and the lower-right detector 23d, enabling highly accurate detection of a touch position in the entire area of the detection region E. Specifically, as shown in the lower part of FIG. 4, in an upper region of the detection region E divided by diagonal lines, the detection regions Ea, Eb overlap with each other; in a left region of the detection region E, the detection regions Eb, Ed overlap with each other; in a right region of the detection region E, the detection regions Ea, Ec overlap with each other; and in a lower region, the detection regions Ec, Ed overlap with each other.

Figure 5:
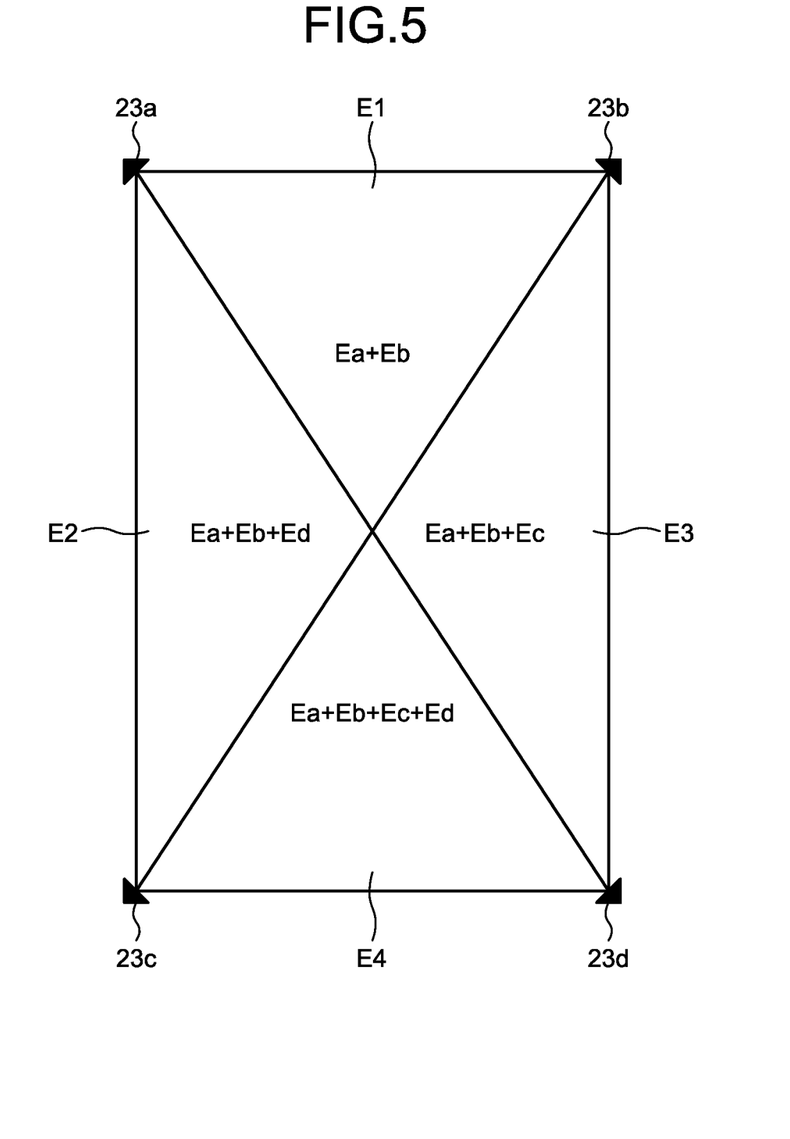
FIG. 5 is an explanatory diagram for explaining the detection processing when the retroreflective plate arranged at the lower frame is normal.

Detection Operation When Reflection Amount of Retroreflective Plate 22b is Normal When the reflection function of the retroreflective plate 22b is normal, as shown in FIG. 5, in an upper region E1 of the detection region E divided by diagonal lines, the detection regions Ea, Eb overlap with each other; in a left region E2 of the detection region E, the three detection regions Ea, Eb, Ed overlap with each other; in a right region E3 of the detection region E, the three detection regions Ea, Eb, Ec overlap with each other; an in a lower region E4 of the detection region E, the four detection regions Ea, Eb, Ec, Ed overlap with each other.

In this case, two detection regions that are used prior to others in identification processing of a touch position are determined in advance in the region in which three or more detection regions overlap with each other, and other detection regions are used as supplemental regions in the identification processing of a touch position. For example, the two detection regions in each region shown in the lower part of FIG. 4 are set as priority detection regions. For example, in FIG. 5, for the left region E2, out of the detection regions Ea, Eb, Ed, the detection regions Eb, Ed are set as the priority detection regions for the identification processing of a touch position, and the detection region Ea is set as a supplementary detection region for the identification processing of a touch position. When the supplementary region is used, highly accurate touch position identification can be performed. On the other hand, to perform speedy touch position identification, only the priority detection regions can be used.

Although in the first embodiment described above, the retroreflective plate 22b is provided at the inside of the lower frame, it is only necessary to provide the retroreflective plates 22a, 22c, and the four detectors of the upper-left detector 23a, the upper-right detector 23b, lower-left detector 23c, and the lower-right detector 23d at the four corners of the frame 21, respectively. With this arrangement, at least two detection images can be acquired by two detectors out of the upper-left detector 23a, the upper-right detector 23b, lower-left detector 23c, and the lower-right detector 23d in the entire area of the detection region E as shown in FIG. 4, and a touch position of an operation member can be detected.

Furthermore, although one detection region E is provided in the first embodiment described above, the touch detector 20 can be structured in multiple layers, and more than one layer of the detection region E can be formed therein.

Second Embodiment

Figure 6:
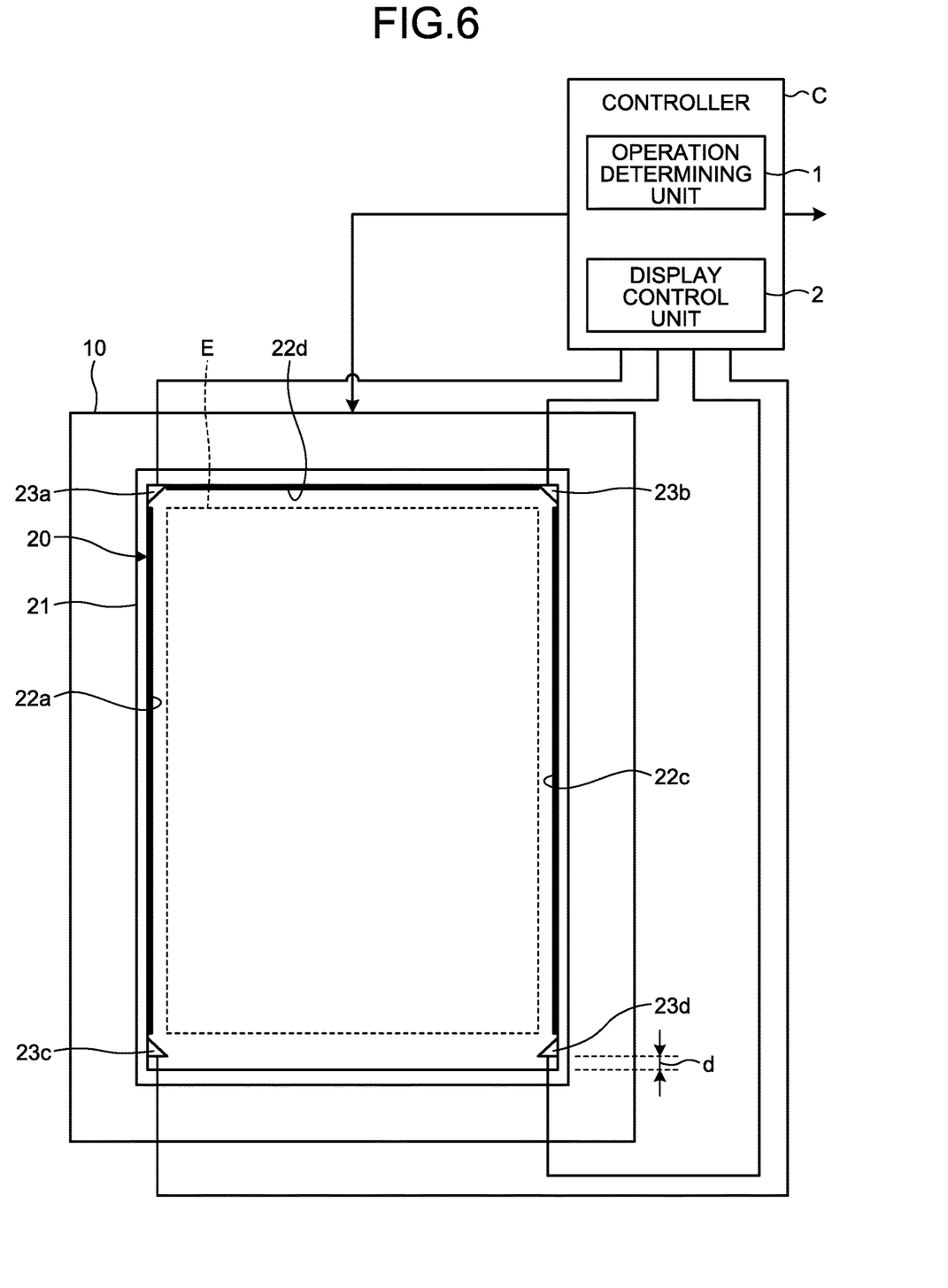
FIG. 6 is a schematic diagram showing a configuration outline of an optical touch panel of a second embodiment of the disclosure.

In the first embodiment described above, the retroreflective plate 22b is provided at the lower portion of the frame 21, and the lower-left detector 23c and the lower-right detector 23d are provided so that a touch position can be detected in the entire area of the detection region E, even when the reflection amount of the retroreflective plate 22b decreases. In addition, to ensure the function of the lower-left detector 23c and the lower-right detector 23d, the lower-left detector 23c and the lower-right detector 23d are arranged at the distance d upward from the retroreflective plate 22b. On the other hand, in a second embodiment, the retroreflective plate 22b is not provided, and a retroreflective plate 22d is provided at the inside of an upper frame of the frame 21 that is not affected by dust, snow, or the like as shown in FIG. 6.

Figure 7:
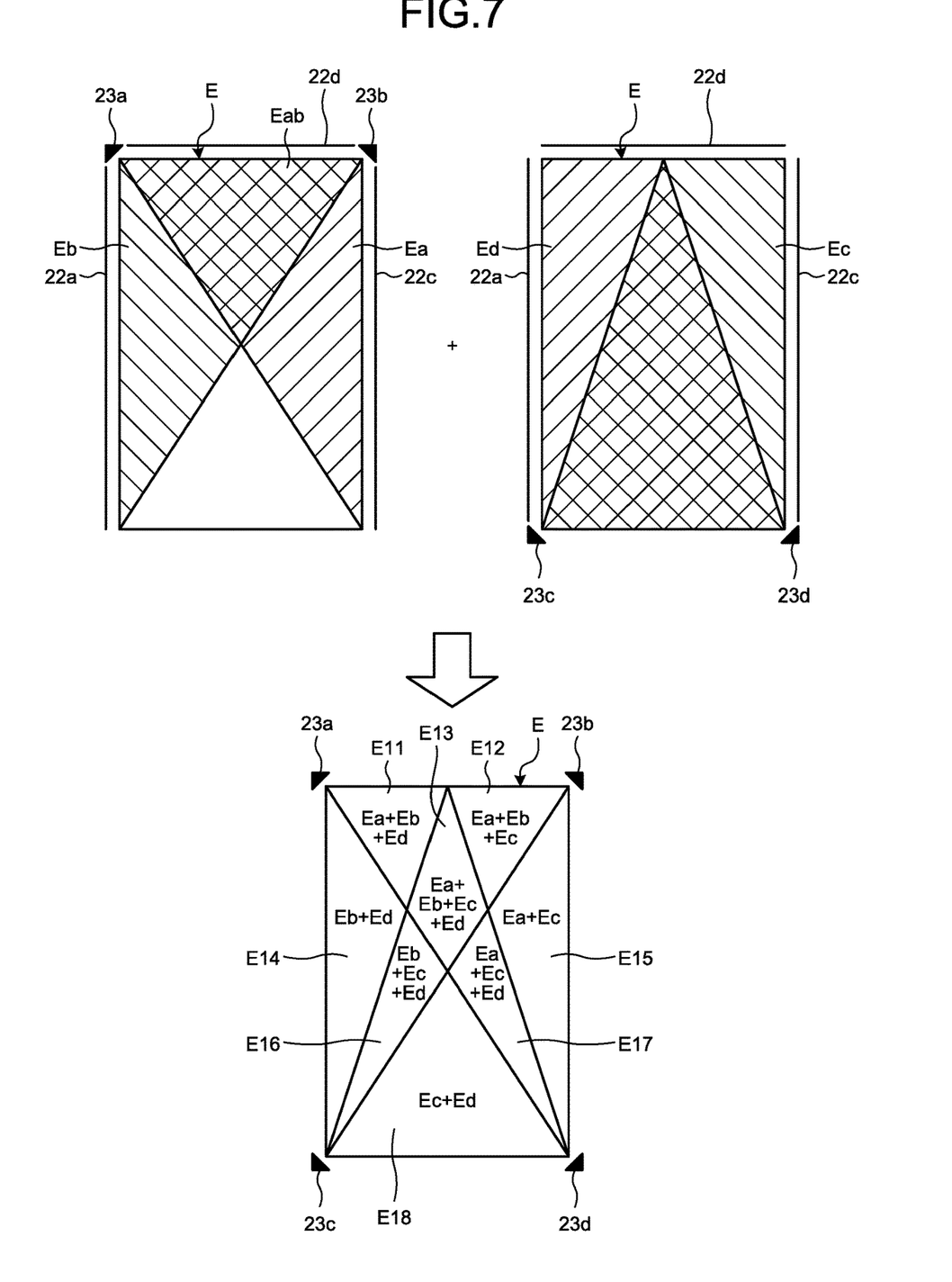
FIG. 7 is an explanatory diagram for explaining the detection processing when the retroreflective plate is arranged at an upper frame.

As shown in an upper left part of FIG. 7, the upper-left detector 23a has the detection region Ea corresponding to the retroreflective plate 22c, and the upper-right detector 23b has the detection region Eb corresponding to the retroreflective plate 22a. On the other hand, as shown in an upper right part of FIG. 7, the lower-left detector 23c has the detection region Ec in a trapezoid shape corresponding to the retroreflective plate 22c and a right-half of the retroreflective plate 22d, and the lower-right detector 23d has the detection region Ed in a trapezoid shape corresponding to the retroreflective plate 22a and a left-half of the retroreflective plate 22d.

As a result, as shown in a lower part of FIG. 7, the detection region E is divided into eight regions, E11 to E18. In each of the region E11 to E18, two or more detection regions overlap with each other, enabling the identification processing of a touch position in the entire area of the detection region E. In the region E11, the three detection regions Ea, Eb, Ed overlap with each other. In the region E12, the three regions Ea, Eb, Ec overlap with each other. In the region E13, the four detection regions Ea, Eb, Ec, Ed overlap with each other. In the region E15, the two detection regions Ea, Ec overlap with each other. In the region E16, the three detection regions Eb, Ec, Ed overlap with each other. In the region E17, the three detection regions Ea, Ec, Ed overlap with each other. In the region E18, the two detection regions Ec, Ed overlap with each other. Similarly to the first embodiment, for the region including three or more detection regions, two regions that are used prior to others in identification processing of a touch position are determined in advance, and other detection regions are determined as supplemental regions for the identification processing of a touch position.

Application to Automatic Vending Machine

Next, application of the optical touch panel to an automatic vending machine is explained. Explanation is given herein taking an automatic vending machine to vend products, such as canned beverages, bottled beverages, plastic-bottled beverages, as an example, but it is not limited thereto. For example, it is applicable also to an automatic vending machine to vend cup drinks that pours drink in a cup, or an automatic vending machine to vend goods.

Figure 8:
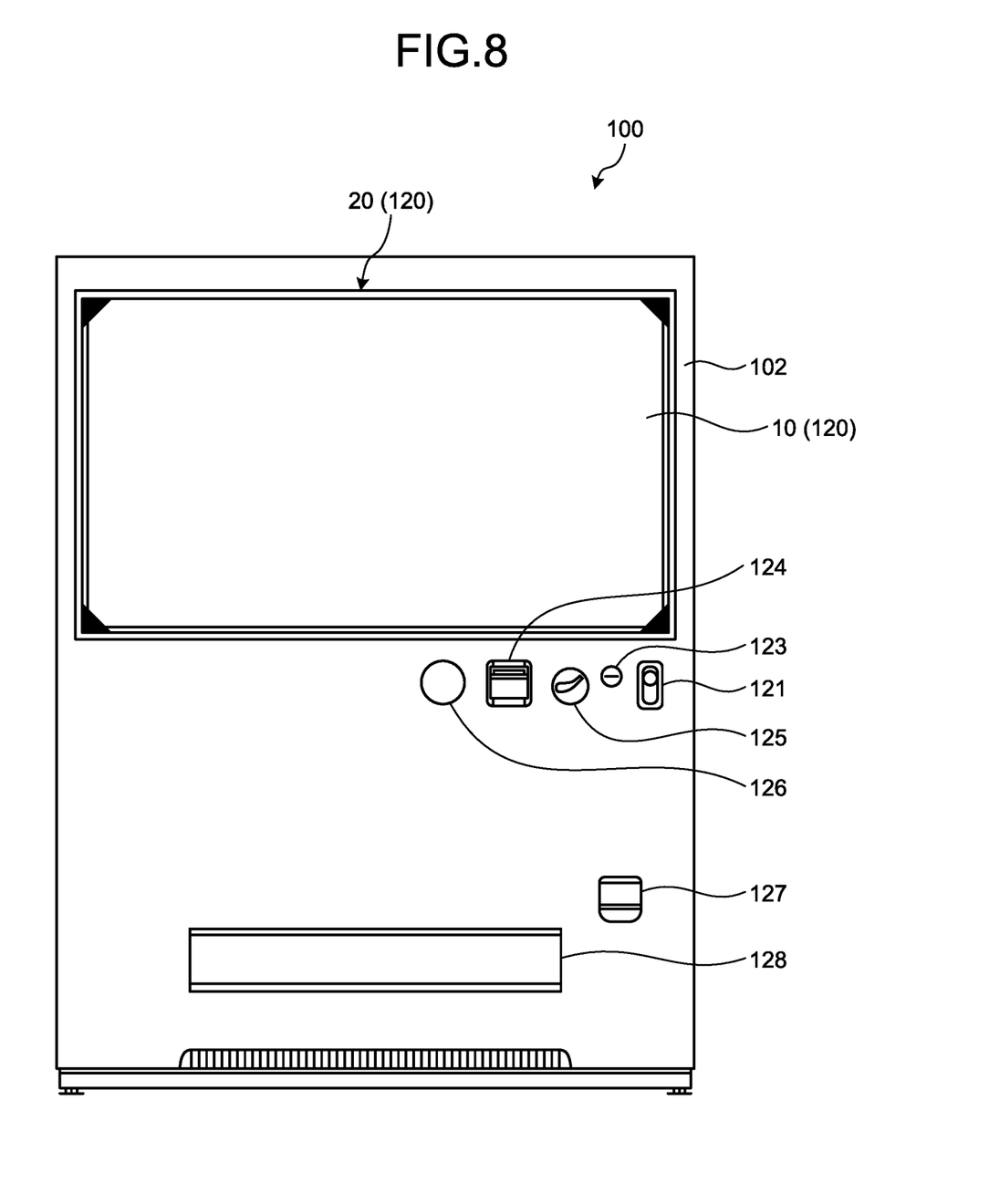
FIG. 8 is a front view showing an external view of an automatic vending machine to which the optical touch panel of the first embodiment of the disclosure is applied.
Figure 9:
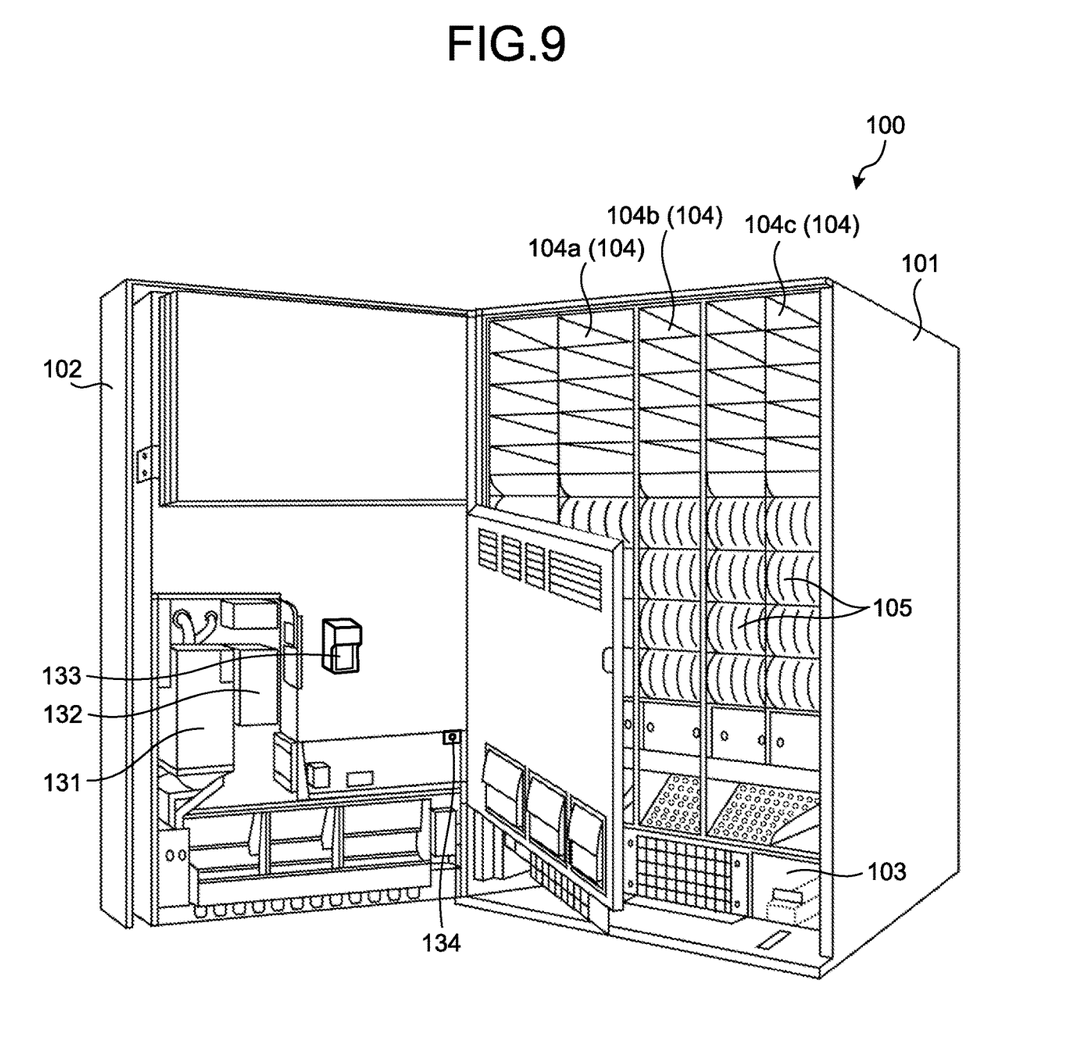
FIG. 9 is a perspective view showing an internal configuration of the automatic vending machine shown in FIG. 8.
Figure 10:
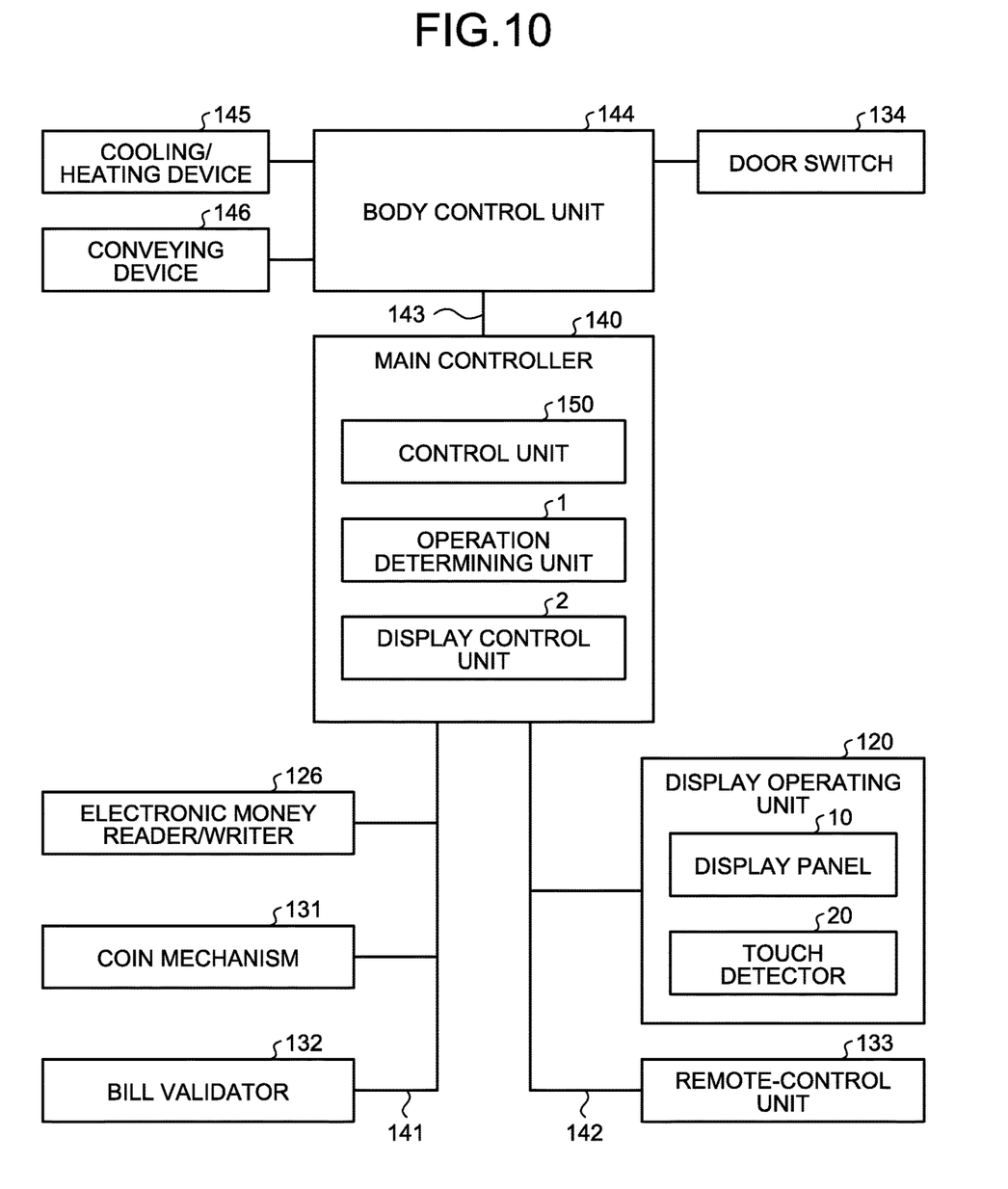
FIG. 10 is a block diagram showing a control configuration of the automatic vending machine shown in FIG. 8.

FIG. 8 is a front view showing an external view of an automatic vending machine to which the optical touch panel described above is applied. FIG. 9 is a perspective view showing an internal configuration of the automatic vending machine shown in FIG. 8. Furthermore, FIG. 10 is a block diagram showing a control configuration of the automatic vending machine shown in FIG. 8.

This automatic vending machine 100 is an automatic vending machine to vend products such as canned beverages, bottled beverages, and plastic-bottled beverages, and has a body cabinet 101 as shown in FIG. 9. The body cabinet 101 is structured in a box-shape that opens on a front side by combining multiple steel sheets. The front opening of the body cabinet 101 is closed by an openable external door 102.

An internal portion of the body cabinet 101 is partitioned into a machine room 103 and a product room 104. Moreover, the product room 104 is further comparted into three product storages 104*a*, 104*b*, 104*c* separated by heat insulating boards. Out of these three product storages 104*a*, 104*b*, 104*c*, the product storage 104*a* on a left side when viewed from the front (hereinafter, "left storage") and the product storage 104*b* in center (hereinafter "center storage") are switchable between warm and cool. When the product storage 104*a* (104*b*) is configured to cooling, the inside of the product storage 104*a* (104*b*) is cooled, thereby cooling products stored in the product storage 104*a* (104*b*). On the other hand, when the product storage 104*a* (104*b*) is configured to heating, the inside of the product storage 104*a* (104*b*) is heated, thereby heating products stored in the product storage 104*a* (104*b*). Moreover, the product storage 104*c* on a right side when viewed from the front (hereinafter, "right storage") is a cooling only storage, and the inside of the product storage 104*c* is cooled, thereby cooling products stored in the product storage 104*c*.

In the product storages 104*a*, 104*b*, 104*c*, product storage racks 105 are provided. In the automatic vending machine 100, two rows of the product storage racks 105 are provided in a direction of width in the left storage 104*a*, 104*c*, and one row of the product storage rack 105 is provided in a direction of width in the center storage 104*b*. Moreover, in the product storage racks 105, five paths (hereinafter, these paths may be referred to as "racks" for convenience) are arranged in a direction of depth of the product storages 104*a*, 104*b*, 104*c*, and, products can be stored in the respective paths.

As shown in FIG. 8, a main door lock 121 is arranged at a right middle portion on the front side of the external door 102, and locks the external door 102 in a closed state. Furthermore, a display operating unit 120 (refer to FIG. 8) is arranged at an upper portion on the front side of the external door 102. The display operating unit 120 is a combination of a large-sized display panel 10 and the touch detector 20, and displays a vending display screen. In the vending display screen, products that can be sold are displayed, and a product is determined, at least, by detection of an operation member described above.

Furthermore, at a middle portion of the external door 102 below the display operating unit 120, a coin insertion slot 123, a bill insertion slot 124, a return lever 125, and an electronic money reader/writer 126 are arranged.

The coin insertion slot 123 is an opening to accept coins. A coin inserted through the coin insertion slot 123 is stored in a coin mechanism (coin processing device) 131 (refer to FIG. 9) mounted on an inner side of the external door 102. The coin mechanism 131 sorts out the inserted number of various kinds of coins to transmit to a main controller 140 (refer to FIG. 10) described later, and dispenses various kinds of coins in accordance with a command from the main controller 140. Moreover, the coin mechanism 131 mounted on the automatic vending machine 100 has a self-monitoring function of monitoring the own state, and when a cassette tube (not shown) storing coins is removed to collect the coins stored therein, or when an inventory switch (not shown) is operated, the coin mechanism 131 transmits information indicating the fact (execution of coin collection operation) to the main controller 140 described later.

The bill insertion slot 124 is an opening to accept bills. A bill inserted through the bill insertion slot 124 is stored in a bill validator (bill processing device) 132 (refer to FIG. 9) mounted on the inside of the external door 102. The bill validator 132 sorts out the inserted number of bills to transmit to the main controller 140 (refer to FIG. 10), and dispenses bills in accordance with a command from the main controller 140. Furthermore, the bill validator 132 mounted on the automatic vending machine 100 has a self-monitoring function of monitoring the own state, and when a stacker (not shown) storing bills is released, the bill validator 132 transmits information indicating the fact (execution of bill collection operation) to the main controller 140 described later.

The return lever 125 is to instruct discontinuance of transaction. When the return lever 125 is operated, transaction is discontinued, and changes or the like are discharged to a return slot 127. The electronic money reader/writer 126 identifies a card, and processes payment with electronic money put on the card.

Moreover, at a position below the external door 102, a discharge port 128 is arranged. The discharge port 128 is an opening to take out a product conveyed from the product storage rack 105.

Furthermore, on the inner side of the external door 102, a remote-control unit 133 is arranged. The remote-control unit 133 is to perform various setting operations or an operation to check various kinds of sales data, and includes a monitor (liquid-crystal character display) to display various setting data and confirmation data in addition to operation keys and a warm/cool switch. The setting data input through the remote-control unit 133 is transmitted to the main controller 140, and confirmation data transmitted from the main controller 140 is received. Moreover, the automatic vending machine 100 includes an operation key (replenish operation key) that is operated when products are replenished (loaded). When the operation key is operated, the remote-control unit 133 transmits information indicating the fact (execution of product replenishing operation) to the main controller 140.

Moreover, on the inner side of the external door 102, a door switch 134 is arranged. The door switch 134 is to detect an open/closed state of the external door 102, and it turns on when the external door 102 is open, and it turns off when closed.

As shown in FIG. 10, the coin mechanism 131, the bill validator 132, and the electronic money reader/writer 126 are connected to the main controller (main control unit) 140 through a line 141, and the display operating unit 120 (the display panel 10 and the touch detector 20) and the remote-control unit 133 are connected to the main controller 140 through a line 142. Furthermore, a body control unit 144 is connected to the main controller 140 through a line 143.

To the body control unit 144, a cooling/heating device 145 and a conveying device 146, in addition to the door switch 134 described above, are connected, and the cooling/heating device 145 and the conveying device 146 are controlled thereby in accordance with a command from the main controller 140.

The cooling/heating device 145 is to manage the product storages 104*a*, 104*b*, 104*c* described above to be in a configured state, and cools the inside of the product storage configured to cooling, and heats the inside of the product storage configured to heating.

The conveying device 146 is to manage a vend solenoid provided to each rack, and a sold-out switch, conveys a product from the rack in accordance with a conveyance command transmitted from the main controller 140 to the body control unit 144, and outputs a sold-out signal to the body control unit 144 when all the products stored in the rack have been conveyed therefrom.

As shown in FIG. 10, the main controller 140 includes a control unit 150, the operation determining unit 1, and the display control unit 2.

The control unit 150 centrally controls the electronic money reader/writer 126, the coin mechanism 131, the bill validator 132, the display operating unit 120 (the display panel 10 and the touch detector 20), the remote-control unit 133, the body control unit 144, and the like, and executes the control based on various kinds of setting data stored in a storage unit not shown.

The main controller 140 performs monetary processing based on information of the electronic money reader/writer 126, the coin mechanism 131, and the bill validator 132 when the operation determining unit 1 determines that a decision making operation with respect to products or the like has been made by a touch operation by the operation member based on a result of detection by the touch detector 20, and performs conveyance processing of the product corresponding to a position at which the decision making operation has been made through the body control unit 144.

Detection Region of Touch Detector in Automatic Vending Machine

Figure 11:
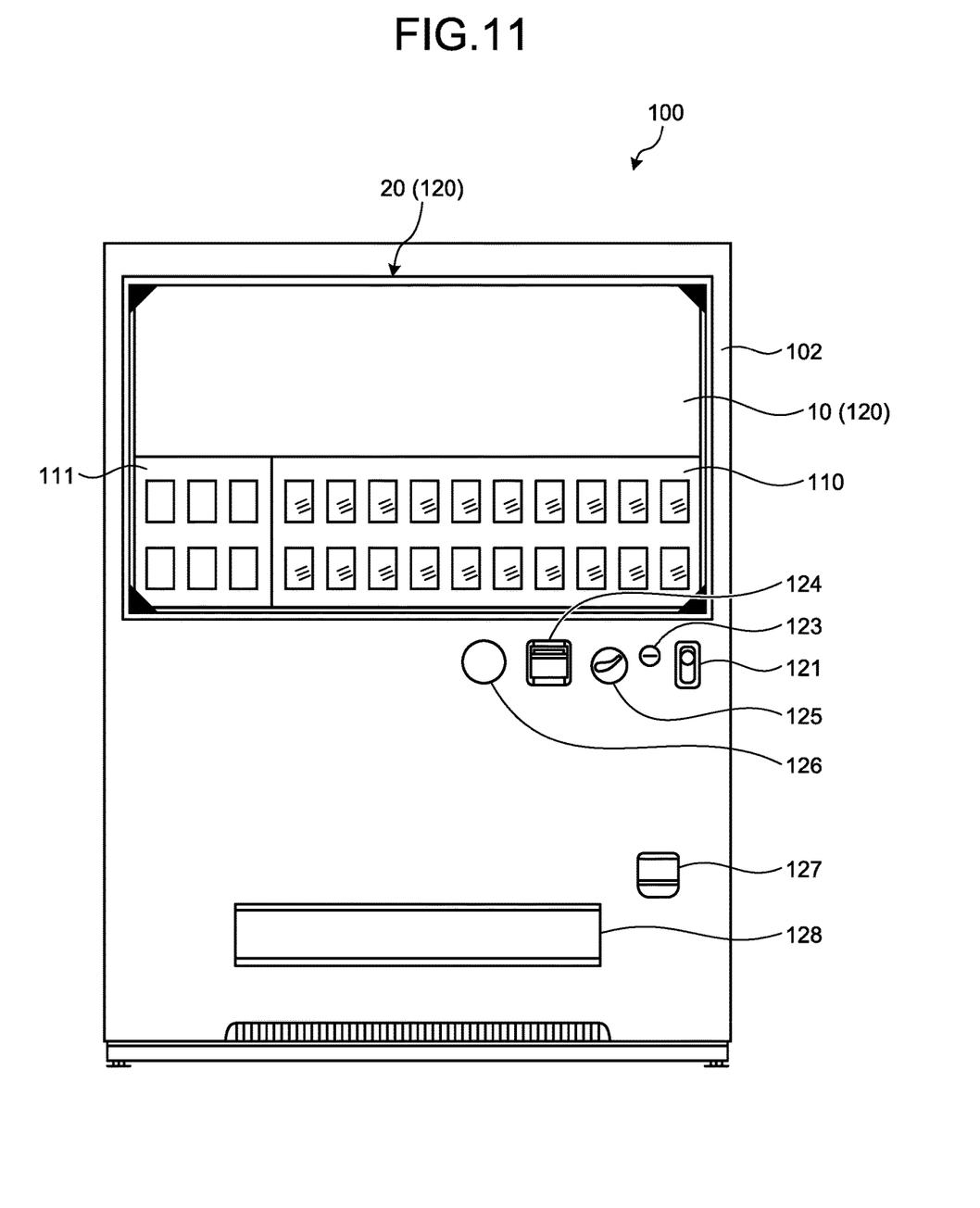
FIG. 11 shows a structure of an external door on a front side when a front surface of a display panel, a front surface of a dummy-product display unit, and a front surface of a flat product-display unit are included in a detecting region of a touch detector.

While the touch detector 20 has the detection region that covers only the large-sized display panel 10, such as a liquid crystal panel, in the automatic vending machine 100 shown in FIG. 8, the touch detector 20 can include, as shown in FIG. 11, a front surface of a dummy-product display unit 110 in which three-dimensional product dummies are displayed, and a front surface of a flat product-display unit 111 in which products are two-dimensionally drawn in the detection region. Moreover, the detection region of the touch detector 20 can be a combination of at least one of the front surface of the display panel 10, the front surface of the dummy-product display unit 110, and the front surface of a flat product-display unit 11. When the front surface of the dummy-product display unit 110 or the front surface of the flat product-display unit 111 is included in the detection region, a guidance display for product purchase can be displayed on the display panel 10, or can be given by a voice guidance.

In contrast to a conventional touch panel of a resistive film type or a capacitive type, the touch detector 20 does not require a touch sensor or a protection film attached to the surface of the display panel 10. Therefore, an arbitrary region on the front surface of various kinds of display units (the display panel 10, the dummy-product display unit 110, the flat product-display unit 111) can be set to the detection region easily.

In some embodiments, a pair of retroreflective plates that are arranged inside at least a left and right pair of frame portions facing each other in a rectangular frame; a plurality of detectors that are arranged at four corners of the rectangular frame, the detectors being configured to irradiate infrared rays to, at least, the retroreflective plates, and to generate detection images based on reflection light from the retroreflective plates; and an operation determining unit configured to detect a touch position based on the detection images generated by the detectors are included. With this arrangement, even when a reflection amount from the retroreflective plate decreases due to accumulation of dust, snow, or the like on the retroreflective plate that is arranged at a lower frame of the optical touch panel, detection of a touch position in an entire area of the detection region is enabled only with the pair of the retroreflective plates that are arranged inside the left and right pair of frame portions, and deterioration of the detection accuracy can be suppressed.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed:

1. An optical touch panel, comprising:
    a first retroreflective plate arranged inside at least a left frame portion in a rectangular frame having a rectangular detection region;
    a second retroreflective plate arranged inside at least a right frame portion in the rectangular frame and facing the first retroreflective plate;
    detectors respectively arranged at four corners of the rectangular frame, the detectors being configured to irradiate infrared rays to, at least, the first and second retroreflective plates, and to generate detection images based on reflection light from the first and second retroreflective plates, the detectors including a first detector having a first detection region corresponding to at least a portion of the rectangular detection region, a second detector having a second detection region corresponding to at least a portion of the rectangular detection region, and a third detector having a third detection region corresponding to only a portion of the rectangular detection region, the first detection region, second detection region, and third detection region overlapping with one another; and
    an operation determining unit configured to detect a touch position based on the detection images generated by the detectors, and to perform detection processing of the touch position by selectively using detection images generated by two of the first, second, and third detectors which are prioritized over a remaining detection image generated by a remaining one of the first, second, and third detectors, according to a specified condition.

2. The optical touch panel according to claim 1, further comprising
    a lower retroreflective plate that is arranged inside a lower frame of the rectangular frame,
    wherein
    one of the detectors is provided at an upper left position and another one of the detectors is provided at an upper right position, among the detectors, and
    each of the detectors provided at the upper left position and at the upper right position is configured to irradiate an infrared ray also to the lower retroreflective plate, and generate a detection image based on reflection light from the lower retroreflective plate.

3. The optical touch panel according to claim 1, further comprising
    an upper retroreflective plate arranged inside an upper frame of the rectangular frame, wherein
one of the detectors is provided at a lower left position and another one of the detectors is provided at a lower right position, among the detectors, and
each of the detectors provided at the lower left position and at the lower right position is configured to irradiate an infrared ray also to the upper retroreflective plate, and generate a detection image based on reflection light from the upper retroreflective plate.

4. The optical touch panel according to claim 1, wherein
one of the detectors is provided at a lower left position and another one of the detectors is provided at a lower right position, among the detectors, and
each of the detectors provided at the lower left position and at the lower right position is arranged at a predetermined distance above from an inside of a lower frame of the rectangular frame.

5. The optical touch panel according to claim 1, wherein when the specified condition is that a speed of touch position identification is prioritized over an accurate touch position identification, the operation determining unit is configured to use detection images that are generated by two of the first, second, and third detectors which are prioritized over the remaining detection image of the remaining one of the first, second, and third detectors which is not prioritized.

6. The optical touch panel according to claim 1, wherein when the specified condition is that an accurate touch position identification is prioritized over a speed of touch position identification, the operation determining unit is configured to use all of the detection images that are generated by the first, second, and third detectors.

7. The optical touch panel according to claim 1, wherein the first detection region and the second detection region correspond to the entire rectangular detection region.

8. The optical touch panel according to claim 1, wherein the first detection region corresponds to half of the rectangular detection region, the second detection region corresponds to another half of the rectangular detection region, and the third detection region is larger than the first and second detection regions.

9. The optical touch panel according to claim 1, wherein the first detection region and second detection region each correspond to greater than half of the rectangular detection region and less than the entire detection region, and the third detection region is less than the first and second detection regions.

10. An automatic vending machine, comprising:
an external door; and
an optical touch panel including:
a first retroreflective plate arranged inside at least a left frame portion in a rectangular frame having a rectangular detection region;
a second retroreflective plate arranged inside at least a right frame portion in the rectangular frame and facing the first retroreflective plate;
detectors respectively arranged at four corners of the rectangular frame, the detectors being configured to irradiate infrared rays to, at least, the first and second retroreflective plates, and to generate detection images based on reflection light from the first and second retroreflective plates, the detectors including a first detector having a first detection region corresponding to at least a portion of the rectangular detection region, a second detector having a second detection region corresponding to at least a portion of the rectangular detection region, and a third detector having a third detection region corresponding to only a portion of the rectangular detection region, the first detection region, second detection region, and third detection region overlapping with one another; and
an operation determining unit configured to detect a touch position based on the detection images generated by the detectors, the optical touch panel being arranged on the external door, and to perform detection processing of the touch position by selectively using detection images generated by two of the first, second, and third detectors which are prioritized over a remaining detection image generated by a remaining one of the first, second, and third detectors, according to a specified condition.

11. The automatic vending machine of claim 10, further comprising:
a controller to perform an operation of the automatic vending machine according to the touch position detected by the operation determining unit.

12. An optical touch panel, comprising:
a first retroreflective plate arranged inside a left frame portion in a rectangular frame having a rectangular detection region;
a second retroreflective plate arranged inside a right frame portion in the rectangular frame and facing the first retroreflective plate;
a first detector, second detector, and third detector, provided at a first corner, second corner, and third corner of the rectangular frame, respectively, each of the first, second, and third detectors being configured to irradiate infrared rays to the first and second retroreflective plates to generate a detection image based on reflection light from the first and second retroreflective plates, the first and second detectors being capable of detection in a first detection region and a second detection region, respectively, corresponding to at least a portion of the rectangular detection region, and the third detector being capable of detection in a third detection region corresponding to only a portion of the rectangular detection region, the first, second, and third detection regions overlapping with one another; and
an operation determining unit configured to, according to a specified condition, detect a touch position by performing detection processing of the touch position by selectively using detection images generated by two of the first, second, and third detectors which are prioritized over a remaining detection image generated by a remaining one of the first, second, and third detectors.

* * * * *

UNITED STATES PATENT AND TRADEMARK OFFICE
CERTIFICATE OF CORRECTION

PATENT NO. : 10,635,240 B2
APPLICATION NO. : 15/856879
DATED : April 28, 2020
INVENTOR(S) : Makoto Nakamura et al.

Page 1 of 1

It is certified that error appears in the above-identified patent and that said Letters Patent is hereby corrected as shown below:

In the Claims

Column 10, Line 53, In Claim 2, after "plate" delete "that is".

Signed and Sealed this
Twenty-eighth Day of July, 2020

Andrei Iancu
*Director of the United States Patent and Trademark Office*